United States Patent [19]

Chiang

[11] Patent Number: 4,859,379
[45] Date of Patent: Aug. 22, 1989

[54] PROCESS FOR REDUCING DRAW RESONANCE BY HEATING FILM AFTER EXTRUSION

[75] Inventor: Alan W. Chiang, North Vassalboro, Me.

[73] Assignee: Mobil Oil Corporation, New York, N.Y.

[21] Appl. No.: 139,414

[22] Filed: Dec. 30, 1987

[51] Int. Cl.⁴ .............................................. B29C 47/88
[52] U.S. Cl. .................................. 264/25; 264/556; 264/216; 264/235; 264/346; 425/174.4; 425/224
[58] Field of Search ............... 264/25, 212, 216, 235, 264/346, 348, 556; 425/224, 174.4, 461

[56] References Cited

U.S. PATENT DOCUMENTS

| | | | |
|---|---|---|---|
| 3,029,474 | 4/1962 | Voigt et al. | 264/564 |
| 3,243,486 | 3/1966 | Pilaro | 425/326.1 |
| 3,632,716 | 1/1972 | Fairbanks | 264/348 |
| 4,216,253 | 8/1980 | Bonnebat et al. | 425/380 |
| 4,332,543 | 6/1982 | Fulton et al. | 425/461 |
| 4,486,377 | 12/1984 | Lucchesi et al. | 425/224 |
| 4,608,221 | 8/1986 | Kurtz et al. | 425/224 |
| 4,668,463 | 5/1987 | Cancio et al. | 425/224 |

Primary Examiner—Jeffery Thurlow
Attorney, Agent, or Firm—Alexander J. McKillop; Charles J. Speciale; Michael J. Mlotkowski

[57] ABSTRACT

Films such as LLDPE extruded through a slot-die and drawn under high Deborah number conditions behave like elastic solids and exhibit draw resonance which is alleviated by heating the film after it exits the extruder, e.g., with radiant heaters.

18 Claims, 1 Drawing Sheet

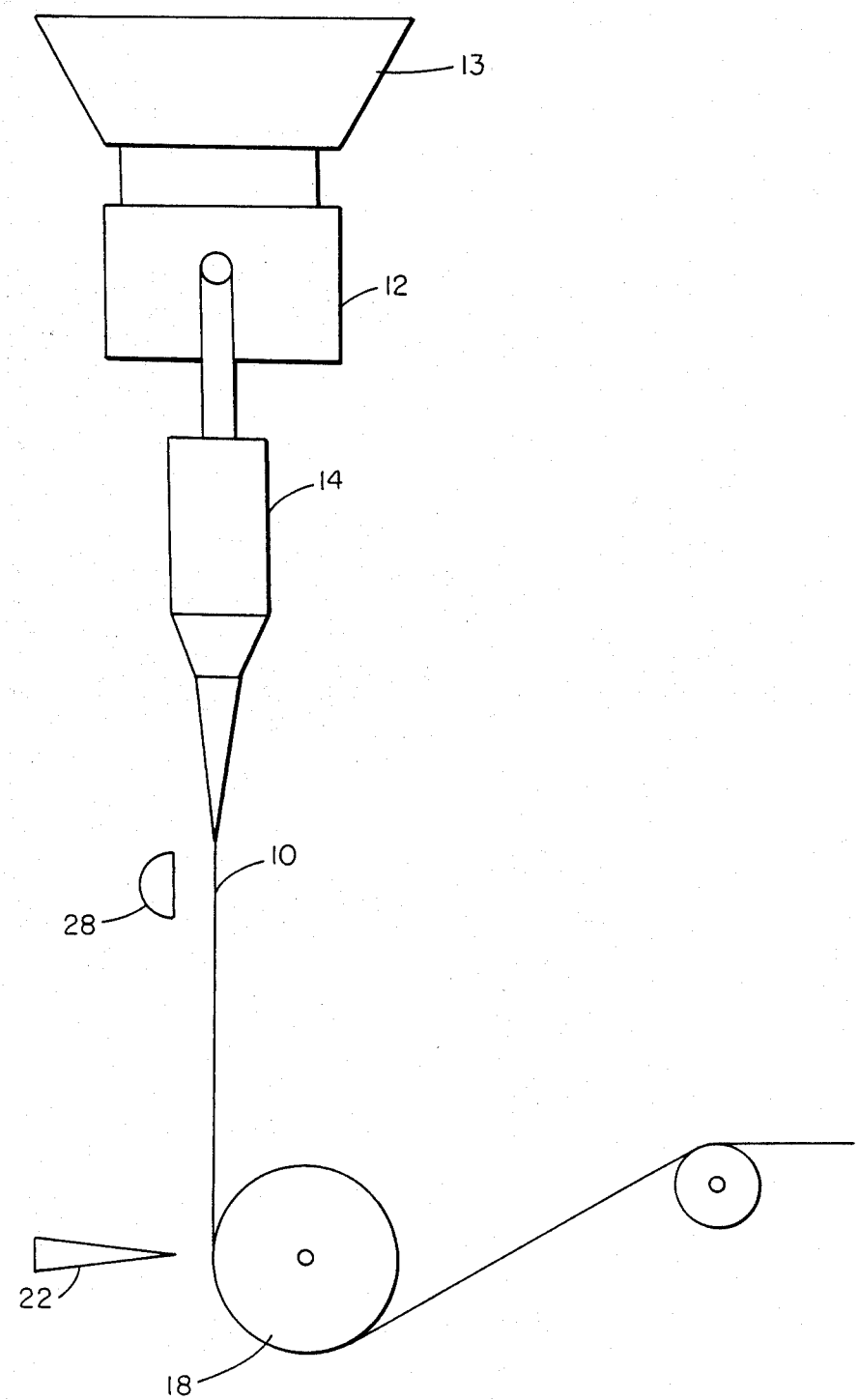

PROCESS FOR REDUCING DRAW RESONANCE BY HEATING FILM AFTER EXTRUSION

BACKGROUND OF THE INVENTION

Thin thermoplastic films are produced by extrusion, generally by the blown tube method or the slot-die method. In the slot-die method film heated plastic is extruded out of a narrow slot in an elongated die. Flat film is generally made in considerable widths on relatively large machines which run at high production rates of 100 to 300 or more meters/minute. The hot extrudate in the form of a web from the slot-die is drawn and stretched through an air-gap to the desired gauge thickness and width by a roller or rollers which operate at a greater speed than the film is extruded from the slot die. Typically, the film passes from the slot die through an air-gap to a chill roll equipped with an air-knife to assist in maintaining good contact between the film and the chill roll, and finally to a take-up roll.

High pressure low density polyethylene (LDPE) films have been susessfully produced by the slot-die method at high line speeds. But when linear low density polyethylene (LLDPE) is processed in the same way it has been recognized that it is susceptible to draw resonance at a relatively low draw or take-up rate. Draw resonance is a phenomenon associated with stretching motions and it is manifested by the occurrence of periodic fluctuations in the thickness of the extrudate as it is drawn. Draw resonance is a function of the take-up rate as well as the draw ratio, the draw ratio being the ratio of the die-slot width to the film thickness. For a given linear low density polyethylene, draw resonance is expected to be more severe in drawing a thinner gauge of the film through the same die-gap, and its onset at a lower draw speed, than in a thicker gauge film. Film exhibiting draw resonance can have gauge thickness variations on the order of 5%, or more, which is considered to be commercially unsatisfactory.

Various methods have been proposed for reducing draw resonance such as described in U.S. Pat. No. 4,626,574 in which a short air-gap is used, and U.S. Pat. No. 4,486,377 in which the film is cooled with a gas stream or the like during its passage through the air-gap to reduce draw resonance.

It is recognized in the rheology of polymers that a viscoelastic material behaves primarily as a viscous liquid or an elastic solid depending on the relation of the time scale of the experiment and the time required for the system to respond to either stress or deformation. The relationship has been defined as the dimensions Deborah number, De (see Z. Tadmor and C. G. Gogos, *Principles of Polymer Processing,* John Wiley and Sons, New York, 1979, pp 40–42, incorporated herein by reference).

A material at high Deborah numbers responds elastically and at low Deborah numbers exhibits mostly viscous behavior. I have found that at high Deborah numbers instability manifesting itself as draw resonance is dominated by elastic deformation and that depression of the elastic deformation by additional heating stabilized the process and reduced draw resonance.

Thus, the solution to the instability problem by heating is opposite to that described in U.S. Pat. No. 4,486,377 in which high temperature operation (515°–575° F., 268°–302° C.) such as melt-embossing and extrusion-coating conducted under low Deborah number conditions, where viscous deformation predominates, is stabilized by cooling the extrudate.

SUMMARY OF THE INVENTION

Draw resonance encountered in the slot-die extrusion of a thermoplastic polymer under high Deborah number conditions is reduced by heating the film while it is in its molten state prior to contact with the chill roll.

BRIEF DESCRIPTION OF THE DRAWING

The FIGURE is a schematic representation of the process of the invention showing an extruder, a slot-die, a molten film exiting the die a heater to heat the molten film, a chill roll to draw and cool the film, and an air-knife to assist in maintaining good contact between the film and the chill roll.

DETAILED DESCRIPTION OF THE INVENTION

The method of this invention is generally applicable to the slot-die extrusion of polymers under high Deborah number conditions. It is illustrated in the example with linear low density polyethylene (LLDPE) produced by the low pressure process and low density polyethylene (LDPE) produced by the high pressure process. It is applicable to other polymers such as polypropylene and high density polyethylene which exhibit draw resonance problems in extrusion.

Suitable linear low density ethylene copolymers for the process of the present invention are those copolymers of ethylene and one or more $C_3$ to $C_8$ alpha olefins having a density of about equal to or greater than 0.87 to equal to or less than 0.940 and preferably of about equal to or greater than 0.916 to equal to or less than 0.928. These copolymers can be made in a solution, slurry or gas phase process well known to those skilled in the art and are widely commercially available. Generally, the suitable linear low density ethylene copolymers are those having a major mole percent of equal to or greater than 80 of ethylene and a minor mole percent (of equal to or less than 20) of one or more $C_3$ to $C_8$ alpha olefins. The $C_3$ to $C_8$ alpha olefins include propylene, butene-1, pentene-1, heptene-1, 4-methyl petene-1, hexene-1, and octene-1.

Suitable linear low density ethylene hydrocarbon copolymers normally have a standard melt index of equal to or greater than 0.5, preferably equal to or greater than 1.0 and most preferably equal to or greater than 2.0. Also, copolymers of this invention should have a standard melt index of equal to or less than 100, preferably equal to or less than 50, and most preferably equal to or less than 20.

The process as illustrated in the FIGURE and suitable conditions are generally known, with the exception of the heating step accomplished with a radiant heater 28. Thus, a polymer such as LLDPE is fed from hopper 13, through a slot-die 14 in a substantially vertical direction to form an extruded film 10 which is heated with a heater 28, for example a radiant heater. The film passes to a chill roll 18 with contact between the film and the chill roll being maintained with air-knife 22, and then the film passes to a take-up station or subsequent operations (not shown). The distance between the die 14 and the chill roll 18 is the air gap (L) which is desirably a short distance of about 2 to 15 inches.

Although the invention has been described with respect to single film extrusions it is also applicable to coextruded films having two or more layers such as films in which a larger of LLDPE predominates and a thin layer or layers of a second polymer to provide cling or other properties is included.

The invention is illustrated by the following non-limiting example.

EXAMPLE

Extrusions were conducted on an Egan cast line which consists of a 2½ inch extruder and an 18 inch slit die schematically represented in the FIGURE. A 3.4 MI LLDPE resin (Dowlex 2088) and a 5.0 MI LDPE resin (Mobil LGA-015) were used. Melt temperature, extrusion rate, air gaps (L), and line speed were varied. The die gap was set at 30 mil with the film pinned at tangent to the cast roll at different air-gaps. Film samples were collected at different line speed for a fixed extrusion rate. Beyond a critical line speed, the process became unstable and the film so produced was of poor quality due to draw resonance. The heater 28 in the FIGURE was a 2-element Chromalox radiant heater, 18 inch nominal width, 12 volts, 1600 watts, which was placed about 4 inches from the film surface.

In general, heating the film after extrusion, higher melt temperature and larger air gap tend to reduce instability and draw resonance. The following Table summarizes the critical line speed which can be achieved before the onset of instability under various conditions.

TABLE

| Resin | Heating | Extruder Temp °C. | L (cm) | Critical Line Speed (m/min) |
|---|---|---|---|---|
| DOWLEX 2088 | No | 253 | 7.62 | 121 |
| DOWLEX 2088 | No | 274 | 7.62 | 212 |
| DOWLEX 2088 | No | 253 | 10.16 | 159 |
| DOWLEX 2088 | Yes | 253 | 10.16 | 258 |
| LGA 015 | No | 253 | 10.16 | 273 |
| LGA 015 | Yes | 253 | 10.16 | 300+ |

I claim:

1. A process for forming film from a melted polymer comprising:

(a) extruding the polymer through a slot-die under high Deborah number condition;
   (b) heating the extruded film while it is in the molten state,
   (c) cooling the film; and
   (d) drawing the film in the machine direction; said heating in step (b) being sufficient to obtain a film which is more uniform in thickness than a film prepared under the same conditions but without said heating step.

2. The process of claim 1 in which said polymer is a polyethylene polymer or copolymer.

3. The process of claim 1 in which said polymer is a linear polyethylene polymer or copolymer.

4. The process of claim 1 in which said polymer is polypropylene.

5. The process of claim 1 in which said cooling step (c) is conducted by means of an air-knife and a chill roll.

6. The process of claim 1 in which said extrusion is conducted at a temperature below about 260° C.

7. The process of claim 1 in which said extruded film is heated by radiant heaters.

8. The process of claim 2 in which said extruded film is heated by radiant heaters.

9. The process of claim 3 in which said extruded film is heated by radiant heaters.

10. The process of claim 4 in which said extruded film is heated by radiant heaters.

11. The process of claim 5 in which said extruded film is heated by radiant heaters.

12. The process of claim 6 in which said extruded film is heated by radiant heaters.

13. The process of claim 1 which is conducted at a line speed of greater than 150 m/min.

14. The process of claim 3 which is conducted at a line speed of greater than 150 m/min.

15. The process of claim 7 which is conducted at a line speed of greater than 150 m/min.

16. The process of claim 8 which is conducted at a line speed of greater than 150 m/min.

17. The process of claim 10 which is conducted at a line speed of greater than 150 m/min.

18. The process of claim 12 which is conducted at a line speed of greater than 150 m/min.

* * * * *